United States Patent [19]

Chandran et al.

[11] Patent Number: 5,416,127
[45] Date of Patent: May 16, 1995

[54] RADIATION CURABLE HOT MELT PRESSURE SENSITIVE ADHESIVES

[75] Inventors: Rama Chandran, South Bound Brook; Roopram Ramharack, Montgomery; Irwin J. Davis, Cranbury; John C. Leighton, Flanders, all of N.J.

[73] Assignee: National Starch and Chemical Investment Holding Corporation, Wilmington, Del.

[21] Appl. No.: 186,727

[22] Filed: Jan. 26, 1994

Related U.S. Application Data

[63] Continuation-in-part of Ser. No. 10,127, Jan. 28, 1993, abandoned.

[51] Int. Cl.$^6$ .................. C09J 123/36; C09J 133/14; C09J 133/08; C09J 133/10
[52] U.S. Cl. .................................. 522/149; 522/151; 522/152; 528/69; 528/75; 525/293; 525/328.2; 525/328.8; 525/329.9
[58] Field of Search ............... 522/116, 149, 151, 152, 522/153; 528/69, 75; 525/293, 328.2, 328.8, 329.9

[56] References Cited

U.S. PATENT DOCUMENTS

| | | | |
|---|---|---|---|
| 4,052,527 | 10/1977 | Pastor et al. | 428/463 |
| 4,151,055 | 4/1979 | Stueben et al. | 204/159.15 |
| 4,165,266 | 8/1979 | Stueben et al. | 204/159.15 |
| 4,181,752 | 1/1980 | Martens et al. | 427/54.1 |
| 4,234,662 | 11/1980 | Pastor et al. | 428/500 |
| 4,665,106 | 5/1987 | Ohta et al. | 522/149 |
| 4,714,655 | 12/1987 | Bordoloi et al. | 428/345 |
| 4,761,435 | 8/1988 | Murphy et al. | 522/46 |
| 4,769,419 | 9/1988 | Dawdy | 525/111 |
| 4,920,157 | 4/1990 | Schulz et al. | 522/96 |
| 5,018,337 | 5/1991 | Carter et al. | 525/127 |
| 5,087,686 | 2/1992 | Ansell et al. | 528/49 |
| 5,128,386 | 7/1992 | Rehmer et al. | 522/35 |
| 5,130,369 | 7/1992 | Hughes et al. | 526/212 |
| 5,149,586 | 9/1992 | Ishiwata et al. | 428/345 |
| 5,187,235 | 2/1993 | Bordoloi et al. | 525/305 |
| 5,202,361 | 4/1993 | Zimmerman et al. | 522/116 |
| 5,225,470 | 7/1993 | Mancinelli | 524/271 |
| 5,231,137 | 7/1993 | Fisher et al. | 528/75 |

OTHER PUBLICATIONS

Dexter et al "m-TMI, A Novel Unsaturated Aliphatic Isocyanate" Journal of Coatings Technology vol. 58, No. 737, pp. 43–47, 1986.

*Principles of Polymerization*, Second Edition, by George Odian, published by John Wiley & Sons (1981), p. 214.

Primary Examiner—Susan W. Berman
Attorney, Agent, or Firm—Jane E. Gennaro

[57] ABSTRACT

This invention is a hot melt pressure sensitive adhesive formed by copolymerizing acrylic, or a combination of acrylic and vinyl, monomers with the functional monomer, 1-(1-isocyanato-1-methyl ethyl)-3-(1-methyl ethenyl)benzene m-TMI, to give a saturated polymer with pendant vinyl groups that are crosslinked by UV or EB radiation.

7 Claims, No Drawings

RADIATION CURABLE HOT MELT PRESSURE SENSITIVE ADHESIVES

This is a continuation in part of abandoned application Ser. No. 08/010,127, filed Jan. 28, 1993.

FIELD OF THE INVENTION

This invention relates to acrylic-based hot melt pressure sensitive adhesives that are radiation cured.

BACKGROUND OF THE INVENTION

Hot melt pressure sensitive adhesives are compositions that combine the properties of hot melt adhesives with the properties of pressure sensitive adhesives. The hot melts are solids at room temperature, melt upon application of heat, and regain their solid form on cooling. The pressure sensitives are aggressive and permanently tacky at room temperature, and adhere to surfaces by the application of light finger pressure. The combination of these properties provide compositions that are melts at elevated temperatures and cool to form a permanently tacky solid coating that adheres on contact. These compositions are most commonly used applied to various substrates, such as paper, cloth, metal, and plastic films, which are then converted into tapes and labels for use in the packaging industry, particularly in marking, sealing and bonding applications, or for use in the health and pharmaceutical industry, particularly in bandages or transdermal drug delivery systems.

A good workable hot melt pressure sensitive adhesive must exhibit high cohesive strength at room temperature, low shrinkage on substrates (particularly flexible plastic), retention of pressure sensitive properties during storage and use, and a relatively fluid viscosity at commonly employed application temperatures of 80°–180° C. Although very low molecular weight polymers will yield a hot melt with sufficient fluidity, the resulting adhesives lack cohesive strength. High molecular weight polymers give better cohesive strength, but are too viscous at the common application temperatures to be easily coatable on substrates and must be extended with a high proportion of low molecular weight oils or resins to reduce the viscosity. The addition of low molecular weight oils or resins in turn detracts from the cohesive strength.

To circumvent these problems, low molecular weight polymers have been made with olefinic unsaturation on side chains. The olefinic unsaturation is then crosslinked by electron beam or ultra-violet irradiation to provide sufficient cohesion and tack. Ordinarily, most of the olefinic double bonds that polymerize by free radical reactions are also thermally polymerizable. In this regard, it is known that acrylates, methacrylates, styrenes, vinyl ester, and allyl compounds, for example, are quite susceptible to thermally induced polymerization (see, Principles of Polymerization, Second Edition, George Odian, John Wiley & Sons (1981), page 214). A hot melt adhesive, which is a 100% solid composition, must be heated to temperatures in the range of 80°–180° C. in order to realize a sufficient viscosity for the proper processing and coating of the polymer. When hot melt pressure sensitive adhesives with pendant unsaturation encounter high processing temperatures for long periods of time, the pendant unsaturation begins to crosslink and the adhesives exhibit an increase in viscosity and eventually gel.

For example, U.S. Pat. No. 4,234,662, issued 18 Nov. 1980 to Pastor et al., teaches a hot melt pressure sensitive adhesive prepared by introducing a predetermined amount of pendant vinyl unsaturation into a saturated polymeric chain that is the base for the adhesive. In the method disclosed in this patent, allyl acrylate or methacrylate is copolymerized with an acrylic monomer and reliance is placed on the difference in reactivity between the acrylic double bond and the allylic double bond to control the level of polymerization, and ultimately, the level of crosslinking. Nevertheless, in commercial practice, this differential is not sufficient and large scale production frequently leads to excessive polymerization and premature gelation.

U.S. Pat. No. 4,665,106, issued 12 May 1987 to Ohta et al., teaches a radiation curable pressure sensitive adhesive. This adhesive is not a hot melt, but does comprise low molecular weight oligomers prepared by introducing one or more olefinic unsaturated bonds into side chains of the adhesive polymer. The process comprises copolymerizing an acrylic ester compound with a monomer having a carboxyl, hydroxyl, epoxy, or amine group, and then reacting that functional group in an addition reaction with another monomer having one or more unsaturated double bonds. This method would appear to eliminate the premature gelation during polymerization caused by the presence of allyl groups; however, excessive crosslinking is still a problem that is addressed by the addition of large amounts of chain transfer agents to the adhesive syrup.

Therefore, there is a need for a hot melt pressure sensitive adhesive with a workable combination of good cohesive and adhesive properties, and a controllable amount of crosslinking, that will remain thermally stable during processing and coating operations, but at the same time, will be easily cured by actinic radiation after processing or coating to a substrate.

SUMMARY OF THE INVENTION

This invention is a process for the preparation of a radiation cured, hot melt, pressure sensitive adhesive that is a viscoelastic solid at room temperature, that is fluid and thermally stable at commonly employed industrial application temperatures, and that crosslinks upon exposure to UV or EB radiation to provide pressure sensitivity. The process comprises preparing a saturated polymeric chain from acrylic, or a combination of acrylic and vinyl, monomers, introducing pendant unsaturation onto the saturated polymeric chain by the incorporation of 1-(1-isocyanato-1-methyl ethyl)-3-(1-methyl ethenyl)benzene (m-TMI) in a separate reaction from the initial polymerization, and crosslinking the pendant vinyl unsaturation by irradiation to provide the required pressure sensitivity. The introduction of the pendant unsaturation in a separate reaction from the initial polymerization avoids any problem of premature gelation of the adhesive, and the use of m-TMI, in comparison to other olefinic compounds for crosslinking, eliminates any thermally induced crosslinking during processing or coating operations.

The process comprises the steps of: (a) copolymerizing acrylic, or a combination of acrylic and vinyl, monomers, at least one of which also contains a functional group, such as, a hydroxyl, amine, carboxyl or amide group, to result in a polymer that is a viscoelastic solid at ambient temperature, has a glass transition temperature (Tg) in the range of −60° C. to +5° C., preferably −50° C. to −5° C., and has a Brookfield viscosity in the range of 500,000 to 1,000 mPa.s (cps) at temperatures in the range of 80° C. to 180° C.; (b) reacting the functional group on the copolymer with 1-(1-isocyanato-1-methyl ethyl)-3-(1-methyl ethenyl)benzene (m-TMI) in a condensation reaction, thereby providing a polymer that is a solid at ambient temperature, and that has pendant vinyl groups that are stable to thermally induced crosslinking at temperatures up to 180° C.; and (c) exposing the polymer to electron beam or ultraviolet radiation sufficient to crosslink the pendant vinyl groups and provide a pressure sensitive adhesive.

In another embodiment, this invention is a process for preparing a hot melt pressure sensitive adhesive on a substrate that incorporates the steps of heating the resultant polymeric solid to a temperature in the range of 80° C. to 180° C. to render the solid fluid and coatable and coating the fluid polymer onto a substrate before irradiation.

In other embodiments, this invention is a radiation curable hot melt adhesive that achieves pressure sensitivity on irradiation with UV or EB radiation, the radiation cured hot melt pressure sensitive adhesive, and the radiation cured hot melt pressure sensitive adhesive on a substrate.

DETAILED DESCRIPTION OF THE INVENTION

The acrylic monomers that may be used to form the polymeric base of the hot melt pressure sensitive adhesives of this invention include $\alpha,\beta$-unsaturated mono- and dicarboxylic acids having 3–5 carbon atoms, acrylate ester monomers selected from the group consisting of the alkyl esters of acrylic and methacrylic acid in which the alkyl groups contain 4 to 14 carbon atoms, preferably 4 to 8 carbon atoms, such as, n-butyl acrylate, n-pentyl acrylate, n-hexyl acrylate, n-heptyl acrylate, n-octyl acrylate, n-nonyl acrylate, and their corresponding branched isomers, such as, 2-ethylhexyl acrylate.

The vinyl monomers that may be used in combination with the acrylic monomers include vinyl monomers selected from the groups consisting of vinyl esters, vinyl ethers, vinyl halides, vinylidene halides, and nitriles of ethylenically unsaturated hydrocarbons, and include, vinyl acetate, acrylamide, t-octyl acrylamide, acrylic acid, vinyl ethyl ether, vinyl chloride, vinylidene chloride, acrylonitrile, maleic anhydride and styrene.

In addition, other acrylate monomers, such as methyl acrylate and methyl methacrylate, which are not considered tacky or pressure sensitive, may be used in combination with the acrylic monomers, or the combination of acrylic and vinyl monomers, known to have pressure sensitivity, in amounts such that the monomers known to impart pressure sensitivity will constitute at least about 50% by weight of the total copolymer.

The exact relative amounts of the specific components making up the acrylic-based adhesive are dependent upon the final properties desired and the end uses contemplated, and are known in the art. The process of the present invention is adaptable to be used with all such pressure sensitive adhesives.

The acrylic or vinyl monomers that ultimately will react with m-TMI will contain hydroxyl, amine, carboxyl or amide groups. Examples of such monomers are 2-hydroxyethyl acrylate, 2-hydroxypropyl acrylate, 4-hydroxybutyl acrylate, and their corresponding methacrylates; acrylic acid and methacrylic acid; t-butylaminoethylmethacrylate, acrylamide and methacrylamide; and allyl alcohol. In general, the functional olefinic monomer will be present in an amount from 0.1% to 15% by weight of the polymer.

As known by those skilled in the art, the preparation of the base polymer can be carried out using well-known polymerization procedures, such as free radial, anionic, and cationic techniques. Thus, the polymer can be prepared by solution, emulsion, or bulk polymerization procedures; and formed into a hot melt by removal of the solvent, coagulation of the latex, or melt-processing of the neat polymer. After the polymerization is complete, the pendant functionality on the polymer chain is reacted in a condensation reaction with m-TMI.

The amount of m-TMI for ultimate irradiation crosslinking that is incorporated into the polymeric chain will be a sufficient amount to provide crosslinking to result in an excellent balance of tack, peel adhesion, and cohesive strength for the end use contemplated. This amount will be dependent on the polymeric composition, as well as the source of radiation, the amount of radiation received, the production line speed, and the thickness of the adhesive coating on the substrate. In general, this amount will be in the range of 0.01 to 10 weight %.

The adhesive polymer may also comprise various other additives, such as plasticizers, tackifiers, and fillers, which are conventionally used in the preparation of hot melts and pressure sensitive adhesives. The choice and amount of these additives are within the expertise of those skilled in the art.

In most pressure sensitive uses, the hot melt composition is applied to a backing or substrate. The substrate can be in the form of films, tapes, sheets, panels, and the like, and can be made of materials, such as, paper, fabric, plastic, nonwoven fibers, metal, foil, natural rubber, synthetic rubber, wood and plywood. In formulating the exact composition for the adhesives, the components are preferably chosen to provide a hot melt composition that only need be heated to a temperature above 80° C. to render the composition fluid and flowable for the time required for application to the substrate. Commonly used temperatures in industrial applications are in the range of 80° C. to 180°, and usually 120° to 180° C. Typically, the hot melt pressure sensitive adhesives of this invention have melt viscosities between about 500,000–1,000 mPa.s (cps), preferably between about 25,000–2,000 mPa.s (cps) at 180° C.

Application of the hot melt to the substrate may be accomplished using any conventional means, such as, roller, slot orifice, spray or extrusion coating. If a coated substrate is to be used in the form of a roll, the back of the substrate may be coated with a release backsize to prevent the adhesive from adhering to that side of the substrate. If a substrate is to be coated on both sides and rolled, a release paper or other protective means may be laid on one adhesive layer to prevent that adhesive layer from adhering to the adhesive on the other side of the substrate. In some uses, a second substrate may be applied directly to the adhesive.

A pressure sensitive adhesive film may be formed by applying the hot melt to a release material, such as silicone coated paper, and then after curing, the adhesive may be stripped from the release material and used as a film.

After the hot composition is applied, it is crosslinked by ultraviolet (UV) or electron beam (EB) radiation in air or nitrogen atmospheres, which transforms the low cohesive material into an elastomeric adhesive of higher plasticity. The crosslinking may be done immediately after application or at room temperature.

If electron beam radiation is used to crosslink the adhesive, a radiation level of 1-6 megarads is usually sufficient to accomplish the desired amount of crosslinking. The actual radiation level required will be dependent upon the source and intensity of the radiation, the adhesive system being crosslinked, the thickness of the adhesive film, and environmental and other factors. In most practical systems, 3-6 megarads is the preferred radiation dose. The preferred source of radiation is high energy beams from an electron accelerator. High energy beams give an adequate curing dosage and rates of processing as high as 1200 meters per minute. Various types of high power electron linear accelerators are available commercially. Since the radiation levels required to accomplish crosslinking in these systems are relatively low, small power units, such as the Electrocurtain® Processor from Energy Sciences, Inc., Wilmington, Mass., provide sufficient radiation. Alternatively, other high energy radiation, such as, gamma rays, X-rays, and beta rays may be used.

If ultraviolet radiation is used to crosslink the adhesive, a photoinitiator is admixed with the polymeric base before crosslinking, usually in an amount from 0.1% to 6% by weight of the polymer. Suitable photoinitiators are well known to those skilled in the art, and include benzoin ethers, benzophenone, and Michler's ketone. A preferred photoinitiator is 1-hydroxycyclohexyl phenyl ketone, commercially available from Ciba-Geigy Corporation under the tradename Irgacure®184.

Suitable photoactivators may be used in combination with photoinitiators, and if used are employed in the known effective amounts. Examples of photo-activators include hindered amines, aldehydes, and anthroquinone.

The adhesive containing the photoinitiator (and if desired, the photoactivator) is exposed to ultraviolet radiation having a wavelength within the range of 1800-4000 A, preferably 2000-3500 A, for a period of time sufficient to accomplish the desired amount of crosslinking. The exact length of exposure will be dependent upon the nature and intensity of the radiation, the particular ultraviolet photoinitiator and amount used, the adhesive system, the thickness of the adhesive film, environmental factors, and the distance between the radiation source and the adhesive film. The determination of these parameters is within the expertise of one skilled in the art. The actual radiation used can be actinic light from any source, provided it furnishes an effective amount of ultraviolet radiation, since the compositions of the invention activatable by actinic light will generally exhibit their maximum sensitivity to wavelengths in the ultraviolet range. Suitable sources of radiation are carbon arcs, mercury-vapor arcs, fluorescent lamps with special ultraviolet light emitting phosphorus, electronic flash lamps, and the like, and combinations of those. Preferred lamps are the electrodeless microwave powered lamps from Fusion Systems, Rockland, Md., or arc lamps from EYE UV, Wilmington, Mass.

Irradiation may be carried out at any temperature, and most suitably is carried out at room temperature for economic reasons. The distance between the radiation source and adhesive on the coated substrate may range from about 0.32 cm to 25.4 cm (⅛th to 10 inches), and preferably is from 0.32 cm to 17.8 cm (⅛ to 7 inches).

The following examples show the preparation of a hot melt pressure sensitive adhesive with crosslinking functionality introduced with m-TMI, maleic anhydride, amino vinyl ether, or allyl isocyanate. The base polymer was prepared according to the procedure below, functionalized, and tested for thermal stability. The results show that the alpha-methyl styrene moiety of the m-TMI is uniquely resistant to thermal, as well as free radical, polymerization at high temperatures. This stability permits the preparation of high molecular weight 100% solid hot melt systems with pendant alpha-methyl styryl double bonds that are stable up to temperatures of 180° C. for extended periods of time, without the addition of free radical polymerization inhibitors. In addition, the adhesives were heated to 180° C., applied to a substrate, and irradiated with UV or EB radiation to impart pressure sensitivity. The adhesives were then tested for adhesion and cohesion, and the results show that the pendant double bonds of the m-TMI are easily crosslinkable by UV or EB radiation at ambient temperatures (less than 30° C.).

EXAMPLES

Preparation of base polymer. A mixture of acrylates in the ratio of 50 parts ethylhexyl acrylate, 35 parts methyl acrylate, and 10 parts butyl acrylate, was polymerized with 5 parts 2-hydroxyethyl acrylate and 0.1 part mercaptoethanol as a chain transfer agent to give a polymer with 0.43 mmol hydroxy functionality per gram of polymer. The reagents and procedure were the following:

| Monomer Mix | PPHM | Weight (grams) |
| --- | --- | --- |
| 2-Ethylhexyl acrylate (2-EHA) | 50 | 500.00 |
| Methyl acrylate (MAc) | 35 | 350.00 |
| Butyl acrylate (BA) | 10 | 100.00 |
| 2-Hydroxyethyl acrylate (2-HEA) | 5 | 50.00 |
| Mercaptoethanol (2-ME) | 0.1 | 1.00 |
| Initial Charge | | |
| Monomer mix | | 100.10 |
| Ethyl acetate | 16 | 160.00 |
| 2,2'-Azo-bis(2-methylbutanenitrile) (initiator commercially available as Vazo 67 from E.I. Du Pont de Nemours & Company) | 0.1 | 1.00 |
| Monomer Slow Add | | |
| Monomer mix | | 900.90 |
| Initiator Slow Add | | |
| Ethyl acetate | 12 | 120.00 |
| 2,2'-Azo-bis(2-methylbutanenitrile) | 1 | 10.00 |
| Scavenger Slow Add | | |
| Ethyl acetate | 4 | 40.00 |
| t-Amylperoxypivalate (commercially available as Lupersol 554,M50 from Atochem) | 0.9 | 9.00 |
| Total Weight | | 1341.00 |
| Theoretical Solids | | 75.80 |

The monomer mix was prepared and thoroughly mixed. The initial charge was charged to a 3-liter reaction flask, equipped with a condenser, paddle stirrer, dial thermometer, addition funnels, and water bath. The initial charge was heated to reflux and held for ten minutes. Simultaneously, the remaining monomer mix was added over two hours and the initiator was added over three hours while maintaining reflux. At the completion of the initiator addition, the reaction was held at reflux for an additional three hours. At the end of the hold period, the scavenger catalyst was added over one hour and then held at reflux for two hours. The contents were cooled to 25° C. and analyzed for residual 2-EHA. (Residual 2-EHA should be less than 0.1%. If it is greater, additional scavenger is added in an amount of 0.9 pphm and the reaction held for an additional one hour, with repetitions of this step as many times as is needed.) The resulting solution had a solids content of 75-76%; intrinsic viscosity of 0.27-0.31; Mw of approximately 100,000; Mn of approximately 20,000; and a moisture content of 0.067% by Karl Fischer titration.

A second base polymer was prepared according to the same procedure in which 4.2 parts of maleic anhydride was substituted for the 5 parts of 2-hydroxyethyl acrylate to give 0.43 mmol anhydride functionality per gram of polymer.

Addition of Crosslinking Functionality to the Base Polymer. The base polymer was divided into four samples. One sample was held as the control with no olefinic unsaturation incorporated. Three of the samples were reacted in separate condensation reactions with 0.175 millimoles of m-TMI, maleic anhydride, and allyl isocyanate per gram of base polymer. The second base polymer was functionalized with 0.175 millimoles of 3-aminopropylvinyl ether per gram of polymer.

The condensation reactions were conducted in a similar equipment set-up for the polymerization, with the addition of a $CaCl_2$ drying tube to the condenser. The apparatus was sealed to hold 20 mm vacuum. The water content of the polymer solution was checked by Karl Fischer titration and confirmed to be below 0.1%. The olefinic monomer was added to the polymer solution and stirred for ten minutes at 30° C. The catalyst was added and the reaction mix stirred for 10 minutes. The mixture was warmed to 50° C., held for 3 hours, and then cooled to room temperature. When the reaction was complete, the solvent was stripped under reduced pressure (10-30 mmHg) at 95° C. and the reaction product discharged while still approximately 80°-90° C.

Thermal Stability as a Function of Time. The control and each of the samples were held for two hours at elevated temperatures and observed for gelation, an indication of thermally induced crosslinking. The results are set out in Table I and show that the unsaturation from the the alpha-methyl styrene moiety of m-TMI is more thermally stable than the unsaturation introduced from the other olefinic sources.

TABLE I

| Brookfield Viscosity as a Function of Time | | | |
|---|---|---|---|
| Sample | Temp. °C. | 1 Hour | 2 Hours |
| Control | 180 | 4000 mpa.s | mpa.s |
| α-methyl styrene | 180 | 4800 | 7000 |
| maleic anhydride | 150 | gel | gel |
| 3-aminopropyl-vinyl ether | 38 | gel | gel |
| allyl isocyanate | 180 | 6000 | gel |

Application to Substrate and Irradiation of Samples. Additional samples were prepared according to the procedure above incorporating varying levels of m-TMI (in mmol/gram of polymer). Each of the samples was heated to 180° C. and applied at varying coating thicknesses to a 2 mil (1 mil=25 microns) thick polyethylene terephthalate substrate (Mylar ®, a product of DuPont). As applied to substrate, each of the samples was then irradiated with UV or EB radiation at varying line speeds. (The indication "0" in the tables under "Lamp" means that no UV radiation was supplied.) UV radiation was supplied by a D lamp (available from Fusion Systems) at 600 watts at production line speeds from 9 to 24.5m per minute (30 to 80 feet per minute). At 15.25 m/min with a 600 watt lamp, the energy density is calculated to be approximately 0.85 $J/cm^2$. EB radiation was supplied by Electrocurtain Processor at 1-6 Mrads dosage.

Tests for Adhesive Properties. Each of the samples was tested for peel adhesion at 180° angle and holding power (shear adhesion) according to the following test methods for pressure sensitive tapes developed by the Specifications and Technical Committee of the Pressure Sensitive Tape Council.

180° Peel Adhesion Test (PSTC-1): This test measures the force required to remove a pressure-sensitive tape from a stainless steel panel at a 180° angle at a speed of 30.5 cm/minute (12 inch/minute). The tape, poly-(ethylene terephthalate) (Mylar) substrate and the sample adhesives at various coating thicknesses, is prepared to size (2.54 cm×15.25 cm×1.5 mils) (1 inch×6 inch×1.5 mils) and adhered to the stainless steel panel. An end of the tape is pulled back at 180° angle at a rate of pull of 30.5 cm (12 inches) per minute by an Instron Tensile Tester, and the force necessary to effect delamination is recorded in ounces per inch width of tape. Tests were taken at 20 minutes and 24 hours after application to the stainless steel panel. It will be noted that the adhesives prepared suffer a reduction in peel after irradiation. However, the values are still commercially acceptable and are more than compensated by the improvements in cohesive strength.

Shear Adhesion Test (PSTC-7): This test measures the ability (shear strength) of a pressure sensitive tape to remain adhered under load applied parallel to the surfaces of the tape. The coated sample is prepared to size (15.25 cm×1.27 cm) (6 inch×0.5 inch) and is applied to a vertical standard stainless steel panel with a 1.27 cm (0.5 inch) overlap joint. A 1000 g mass is suspended from the sample and the time until failure (separation) is measured. The test is carried out at 23° C. and 50% relative humidity.

The results are set out in the following tables and show that the hot melt pressure sensitive adhesives made by this method have acceptable peel values and good shear values.

TABLE II

| | | | EB | | | |
|---|---|---|---|---|---|---|
| | | | | Peel* | | Shear |
| Sample | Crosslinker mmol/g polymer | Coat Weight (mil) | Dose (mrad) | 20 min Newton/m (oz/in) | 24 hr Newton/m (oz/in) | .28 kg/$cm^2$ (4 psi) hr, min |
| A | 0.44 mmol m-TMI | 1 | 0 | 700.8 (64) c | 774.4 (71) c | 3 min |
| | | 1 | 4 | 229.9 (21) a | 438 (40) a | 91 hr |
| | | 1 | 6 | 175.2 (16) a | 350.4 (32) a | 58 hr |

TABLE II-continued

EB

| Sample | Crosslinker mmol/g polymer | Coat Weight (mil) | Dose (mrad) | Peel* 20 min Newton/m (oz/in) | Peel* 24 hr Newton/m (oz/in) | Shear .28 kg/cm² (4 psi) hr, min |
|---|---|---|---|---|---|---|
| | | 1.5 | 0 | 657 (60) c | 711.7 (65) c | 2 min |
| | | 1.5 | 4 | 416.1 (38) a | 514.6 (47) a | 31 hr |
| B | 0.31 mmol m-TMI | 0.5 | 0 | 711.8 (65) c | 766.5 (70) c | 2.7 min |
| | | 0.5 | 4 | 339.4 (31) a | 470.8 (43) a | 45 hr |
| | | 0.5 | 6 | 284.7 (26) a | 295.6 (27) a | 52 hr |
| | | 1 | 0 | 667.9 (61) c | 733.6 (67) c | 2.5 min |
| | | 1 | 4 | 459.9 (42) a | 667.9 (61) a | 33 hr |
| | | 1 | 6 | 361.3 (33) a | 448.9 (41) a | 36 hr |
| | | 1.5 | 0 | 613.2 (56) c | 657 (60) c | 1 min |
| | | 1.5 | 4 | 514.6 (47) a | 711.7 (65) a | 37 hr |
| | | 1.5 | 6 | 361.3 (33) a | 481.8 (44)a | 25 hr |
| | | 2 | 0 | 657 (60) c | 678.9 (62) c | 1.3 min |
| | | 2 | 4 | 744.6 (68) a | 1029.3 (94) c | 19 hr |
| | | 2 | 6 | 295.6 (27) a | 514.6 (47) a | 22 hr |
| C | 0.175 mmol m-TMI | 1 | 0 | 569.4 (52) c | 635.1 (58) c | 1 min |
| | | 1 | 4 | 547.5 (50) a | 766.5 (70) a | 29 hr |
| | | 1 | 6 | 361.3 (33) a | 525.6 (48) a | 47 hr |
| | | 2 | 0 | 646.0 (59) c | 711.7 (65) c | 1 min |
| | | 2 | 6 | 558.4 (51) a | 558.4 (51) a | 17 hr |
| Control | 0 crosslinker | 1 | 0 | 350.4 (32) c | 448.9 (41) c | 1 min |
| | | 1 | 4 | 459.9 (42) c | 580.3 (53) c | 2 min |
| | | 1 | 6 | 459.9 (42) c | 646.1 (59) c | 2.5 min |

*"a" indicates adhesive failure
"c" indicates cohesive failure

TABLE III

UV

| Sample | Crosslinker mmol/g polymer | Coat Weight (mil) | Lamp | Speed m/min (ft/min) | Peel* 20 min Newton/m (oz/in) | Peel* 24 hr Newton/m (oz/in) | Shear 0.28 kg/cm² (4 psi) hr, min |
|---|---|---|---|---|---|---|---|
| A | 0.44 mmol m-TMI | 1 | O | 0 | 394.2 (36) c | 383.2 (35) c | 0 |
| | | 1 | D | 12.2 (40) | 394.2 (36) a | 448.9 (41) c | 115 hr |
| | | 1.5 | O | 0 | 350.4 (32) c | 405.1 (37) c | 0 |
| | | 1.5 | D | 12.2 (40) | 481.8 (44) a | 613.2 (56) c | 57 hr |
| | | 1.5 | D | 9.15 (30) | 372.3 (34) a | 383.2 (35) a | 104 hr |
| | | 2 | O | 0 | 405.1 (37) c | 448.9 (41) c | 0 |
| | | 2 | D | 9.15 (30) | 405.1 (37) a | 470.8 (43) a | 102 hr |
| | | 2 | D | 12.2 (40) | 536.5 (49) a | 580.3 (53) a | 38 hr |
| | | 3 | O | 0 | 361.3 (33) c | 427.0 (39) c | 0 |
| | | 3 | D | 12.2 (40) | 613.2 (56) a | 788.4 (72) a | |

TABLE III-continued

| Sample | Crosslinker mmol/g polymer | Coat Weight (mil) | Lamp | UV Speed m/min (ft/min) | Peel* 20 min Newton/m (oz/in) | Peel* 24 hr Newton/m (oz/in) | Shear 0.28 kg/cm² (4 psi) hr, min |
|---|---|---|---|---|---|---|---|
| B | 0.31 mmol m-TMI | 0.5 | D | 12.2 (40) | 470.8 (43) a | 876.0 (80) c | 91 hr |
| | | 0.5 | D | 6.1 (20) | 317.5 (29) a | 394.2 (36) a | 70 hr |
| | | 0.5 | D | 18.3 (60) | 886.9 (81) c | 481.8 (44) a | 42 hr |
| | | 1 | O | 0 | 459.9 (42) c | 514.6 (47) c | 0 |
| | | 1 | D | 9.15 (30) | 481.8 (44) a | 886.9 (81) c | 93 hr |
| | | 1 | D | 12.2 (40) | 624.1 (57) a | 700.8 (64) a | 73 hr |
| | | 1 | D | 15.25 (50) | 886.9 (81) c | 711.7 (65) a | |
| | | 1.5 | O | 0 | 448.9 (41) c | 503.7 (46) c | 0 |
| | | 1.5 | D | 12.2 (40) | 700.8 (64) a | 799.3 (73) a | 22 hr |
| | | 2 | O | 0 | 361.3 (33) c | 361.3 (33) c | 0 |
| | | 2 | D | 12.2 (40) | 876.0 (80) a | 1105.9 (101) c | 18 hr |
| C | 0.175 mmol m-TMI | 1.5 | D | 12.2 (40) | 766.5 (70) a | 1073.1 (98) c | 35 hr |
| | | 1 | O | 0 | 394.2 (36) c | 416.1 (38) c | 0 |
| | | 1 | D | 12.2 (40) | 646.1 (59) a | 876.0 (80) a | 24 hr |
| A | 0.44 mmol m-TMI with acrylic acid | 1 | O | 0 | 1105.9 (101) c | 1193.5 (109) c | 0 |
| | | 1 | D | 12.2 (40) | 448.9 (41) a | 470.8 (43) a | 23 hr |
| | | 1.5 | O | 0 | 1095.0 (100) c | 1095.0 (100) c | 0 |
| | | 1.5 | D | 12.2 (40) | 416.1 (38) a | 416.1 (38) a | 16 hr |
| B | 0.31 mmol m-TMI with acrylic acid | 1 | O | 0 | 1095.0 (100) c | 1138.8 (104) c | 0 |
| | | 1 | D | 12.2 (40) | 416.1 (38) a | 503.7 (46) a | 34 hr |
| | | 1 | D | 9.15 (30) | 350.4 (32) c | 24 hr | |
| C | 0.175 mmol m-TMI with acrylic acid | 0.5 | O | 0 | 1073.1 (98) c | 1040.2 (95) c | 0 |
| | | 0.5 | D | 12.2 (40) | 459.9 (42) a | | 18 hr |
| | | 0.5 | D | 6.1 (20) | 306.6 (28) c | | 17 hr |
| | | 1 | O | 0 | 1193.5 (109) c | 1127.8 (103) c | 0 |
| | | 1 | D | 12.2 (40) | 448.9 (41) a | 580.3 (53) a | 19 hr |

*"a" indicates adhesive failure
"c" indicates cohesive failure

We claim:

1. A hot melt, pressure sensitive adhesive polymer, characterized as initially having pendant vinyl groups that are thermally stable to 180° C. and that subsequently are crosslinked on exposure to Electron Beam or Ultra Violet radiation, wherein
   (a) the polymer is prepared by copolymerizing acrylic, or a combination of acrylic and vinyl, monomers, at least one of which also contains a functional group selected from the group consisting of hydroxyl, amine, carboxyl and amide, the monomers chosen to result in a copolymer that is a viscoelastic solid at ambient temperature, has a glass transition temperature (Tg) in the range of −60° C. to +5° C., and has a Brookfield viscosity in the range of 500,000 to 1,000 mPa.s at temperatures in the range of 80° C. to 180° C.;
   (b) the pendant vinyl groups are introduced to the polymer by reacting the functional group on the copolymer with 1-(1-isocyanato-1-methyl ethyl)-3-(1-methyl ethenyl)benzene (m-TMI) in a condensation reaction; and (c) the polymer is exposed to electron beam or ultraviolet radiation sufficient to crosslink the pendant vinyl groups to impart pressure sensitivity.

2. The polymer according to claim 1 in which the radiation is electron beam radiation.

3. The polymer according to claim 1 in which a photoinitiator is admixed into the polymer before it is irradiated, and the radiation is ultraviolet radiation.

4. The polymer according to claim 1 in which the acrylic monomers are selected from the group consisting of $\alpha,\beta$-unsaturated $C_1$–$C_6$ mono- and dicarboxylic acids, and $C_1$–$C_{14}$ alkyl esters of acrylic and methacrylic acid.

5. The polymer according to claim 1 in which the vinyl monomers used in combination with acrylic monomers are selected from the group consisting of vinyl esters, vinyl ethers, vinyl halides, vinylidene halides, and nitriles of ethylenically unsaturated hydrocarbons.

6. The polymer according to claim 1 in which the acrylic or vinyl monomer having a functional group is present in an amount of 0.1%–20% by weight of the polymer.

7. The hot melt, pressure sensitive adhesive polymer of claim 1 coated onto a substrate before exposure to irradiation.

* * * * *